(12) United States Patent
Takanashi et al.

(10) Patent No.: US 10,097,749 B2
(45) Date of Patent: Oct. 9, 2018

(54) IMAGING SYSTEM, IMAGING APPARATUS, LENS UNIT, AND METHOD OF CONTROLLING IMAGING SYSTEM

(71) Applicant: CANON KABUSHIKI KAISHA, Tokyo (JP)

(72) Inventors: Hideya Takanashi, Tokyo (JP); Atsushi Sugita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/233,341

(22) Filed: Aug. 10, 2016

(65) Prior Publication Data

US 2017/0054894 A1 Feb. 23, 2017

(30) Foreign Application Priority Data

Aug. 19, 2015 (JP) .................................. 2015-161604

(51) Int. Cl.
| | |
|---|---|
| H04N 5/232 | (2006.01) |
| G03B 13/36 | (2006.01) |
| G02B 7/09 | (2006.01) |
| H04N 5/225 | (2006.01) |

(52) U.S. Cl.
CPC ........... *H04N 5/23212* (2013.01); *G02B 7/09* (2013.01); *G03B 13/36* (2013.01); *H04N 5/2254* (2013.01); *H04N 5/23209* (2013.01)

(58) Field of Classification Search
CPC .. H04N 5/23212; H04N 5/2254; G03B 13/36; G02B 7/09
See application file for complete search history.

(56) References Cited

U.S. PATENT DOCUMENTS

| | | | | |
|---|---|---|---|---|
| 2009/0295964 A1* | 12/2009 | Utagawa | .............. | H04N 5/2254 |
| | | | | 348/302 |
| 2010/0045849 A1* | 2/2010 | Yamasaki | ................ | G03B 3/10 |
| | | | | 348/349 |
| 2011/0293255 A1* | 12/2011 | Kikuchi | ................. | G02B 7/102 |
| | | | | 396/80 |

(Continued)

FOREIGN PATENT DOCUMENTS

| | | |
|---|---|---|
| JP | 59-151116 A | 8/1984 |
| JP | 2014-029353 A | 2/2014 |

*Primary Examiner* — Shahbaz Nazrul
(74) *Attorney, Agent, or Firm* — Cowan, Liebowitz & Latman, P.C.

(57) ABSTRACT

An imaging system has an interchangeable lens and a camera body capable of communicating with the interchangeable lens. A camera control unit of the camera body acquires focus-sensitivity-related information (including sensitivity information at an image height of the center and correction information of the sensitivity that changes depending on the image height) from a lens control unit of the interchangeable lens through communication at a suitable timing. The camera control unit corrects a change of the sensitivity caused by the image height using image height information of a focus detection region selected from a plurality of focus detection regions and the acquired focus sensitivity correction information. The camera control unit calculates a driving amount of the focus lens from the focus detection signal using the corrected focus sensitivity, generates a control signal for instructing the driving amount, and transmits the control signal to a lens control unit.

13 Claims, 9 Drawing Sheets

(56) References Cited

U.S. PATENT DOCUMENTS

| | | | |
|---|---|---|---|
| 2014/0036134 A1 | 2/2014 | Miyatani | |
| 2014/0300792 A1* | 10/2014 | Nakamura | H04N 5/23212 348/333.08 |
| 2015/0350527 A1* | 12/2015 | Hamano | H04N 5/23212 348/231.99 |
| 2016/0073005 A1* | 3/2016 | Sugita | H04N 5/23212 348/349 |
| 2016/0212325 A1* | 7/2016 | Kikuchi | G02B 7/28 |
| 2017/0013199 A1* | 1/2017 | Kunugi | G02B 27/646 |

\* cited by examiner

IMAGING SYSTEM, IMAGING APPARATUS, LENS UNIT, AND METHOD OF CONTROLLING IMAGING SYSTEM

BACKGROUND OF THE INVENTION

Field of the Invention

The present invention relates to an auto-focus (AF) control technology in an imaging system having a lens unit that can be installed in a camera body.

Description of the Related Art

In order to drive a focus lens in an imaging apparatus, a driving amount of the lens is determined based on focus sensitivity. The focus sensitivity is a coefficient for converting a defocus amount detected by the imaging apparatus into a driving amount of the focus lens. In an interchangeable lens type camera system, the focus sensitivity is determined based on optical information of the interchangeable lens.

In Japanese Patent Laid-Open No. S59-151116, a camera system in which the focus sensitivity is variable depending on focal length information of the lens is disclosed. Using the camera system discussed in Japanese Patent Laid-Open No. S59-151116, it is possible to appropriately set the focus sensitivity depending on the focal length and reduce a focusing time. In addition, in Japanese Patent Laid-Open No. 2014-29353, a method of determining defocus correction data based on a camera state such as a spatial frequency is disclosed.

Here, practical focus sensitivity is changed depending on a focus detection position (image height) as well as focal length information of the lens. The technique of the related art disclosed in Japanese Patent Laid-Open No. S59-151116 fails to consider a change of the focus sensitivity depending on the image height. For this reason, it is difficult to set the focus sensitivity suitable for focusing of the surrounding image height and perform accurate focus control in the event of hunting or the like. In order to acquire more accurate focus sensitivity, it is necessary to acquire focus sensitivity for every image height.

On the other hand, the focus sensitivity information is received in communication through a mount terminal between the camera body and the interchangeable lens. The technique of the related art disclosed in Japanese Patent Laid-Open No. 2014-29353 fails to consider a change of the data in communication depending on the image height. If different data is transmitted for each image height, a communication data amount increases as the focus correction accuracy at the surrounding image height increases. In this case, it is necessary to transmit or receive necessary data within a limited communication band between the camera body and the interchangeable lens.

SUMMARY OF THE INVENTION

The present invention is to improve focus correction accuracy by acquiring sensitivity information and sensitivity correction information in communication between the lens unit and the camera body.

According to an aspect of the present invention, an imaging system is provided that includes a lens unit; and a camera body in which the lens unit is capable of being installed, wherein the lens unit comprises: a focus adjustment lens; a driving control unit configured to control driving of the focus adjustment lens; and a first communication unit configured to communicate with the camera body, wherein the camera body comprises: a second communication unit configured to communicate with the lens unit; a detection unit configured to acquire a focus detection signal in a plurality of regions; and a control unit configured to generate a control signal for controlling driving of the lens using the focus detection signal and transmit the control signal to the lens unit through the second communication unit, wherein the control unit of the camera body acquires, through the second communication unit from the lens unit, conversion information for converting a focus detection signal to a driving amount of the lens and correction information of the conversion information indicating a change of the conversion information corresponding to an image height, wherein the control unit selects a region used to control the driving of the lens from the plurality of the regions after acquiring the conversion information and the correction information, and wherein the control unit generates the driving amount of the lens as the control signal from the conversion information and the correction information in association with the image height of the selected region.

According to the present invention, it is possible to improve focus correction accuracy by acquiring sensitivity information and sensitivity correction information in communication between the lens unit and the camera body.

Further features of the present invention will become apparent from the following description of exemplary embodiments (with reference to the attached drawings).

DESCRIPTION OF THE EMBODIMENTS

Hereinafter, each embodiment will be described with reference to accompanying drawings. A configuration and an operation of an imaging device to which an imaging processing apparatus is applied that are common to each embodiment will be described first and then each embodiment will be described. In each embodiment, a camera with a lens device mounted on an imaging device main body is described as an example, but the present invention is applicable to an information processing apparatus or the like having a camera or an imaging unit in which a lens and an imaging device main body are integrally configured.

First Embodiment

Figure 1:
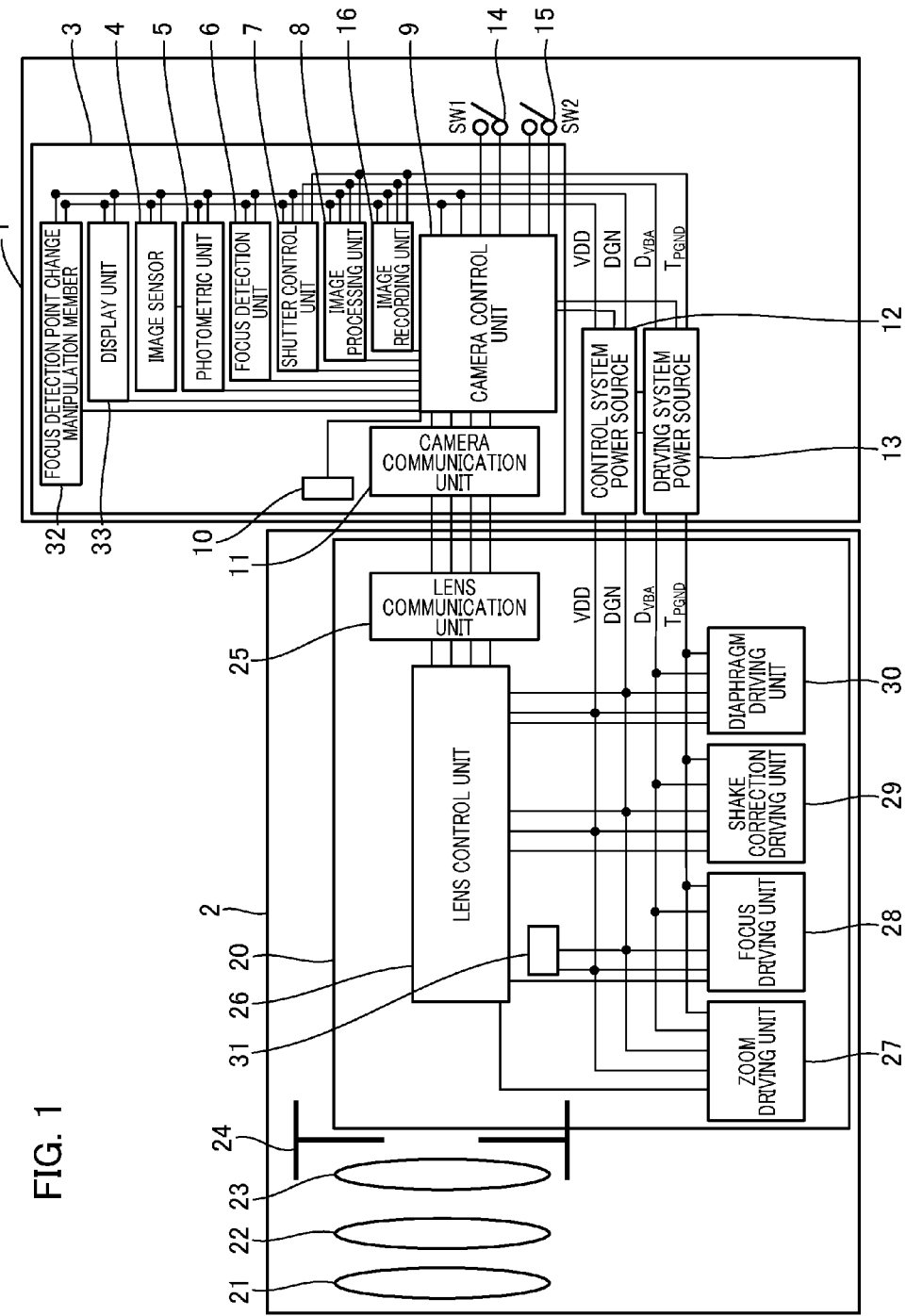
FIG. 1 is a block diagram illustrating an imaging system according to an embodiment of the present invention.

FIG. 1 is a block diagram illustrating an exemplary configuration of an interchangeable camera-lens system having a camera body 1 and an interchangeable lens 2 according to a first embodiment of the invention. The camera body 1 is allowed to communicate with the detachably installed interchangeable lens 2. An electric circuit module 3 of the camera body 1 has an imaging element 4 by which a subject image formed by light passing through the interchangeable lens 2 is photoelectrically converted into an electric signal. The imaging element 4 is a charge-coupled device (CCD) sensor, a complementary metal-oxide semiconductor (CMOS) sensor, or the like and has a plurality of focus detection pixels having different image heights.

The photometric unit 5 measures the amount of light (luminance) passing through the interchangeable lens 2 based on an output from the imaging element 4 and outputs a result of the measurement. A focus detection unit 6 calculates a defocus amount of the interchangeable lens 2 based on each output of the plurality of focus detection pixels of the imaging element 4 having different image heights. A period of the focus detection process is synchronized with a frame rate corresponding to a photographing duration (hereinafter referred to as a "VD"). A communication process between the camera body 1 and the interchangeable lens 2 is performed in synchronization with a VD signal.

A shutter control unit 7 controls a shutter opening/closing operation (not shown) for controlling an exposure amount of the imaging element 4. An image processing unit 8 performs various processes for the output from a predetermined number of imaging pixels provided in the imaging element 4 to create image data. The various processes include processes using stored information of the interchangeable lens 2 and the stored information of the camera body 1.

A camera control unit 9 serves as a control center of the imaging apparatus provided with a central processing unit (CPU), a memory, and the like. The camera control unit 9 controls operations of each component of the imaging apparatus. The camera body 1 is provided with a camera communication unit 11, and the interchangeable lens 2 is provided with a lens communication unit 25, so that the camera control unit 9 can communicate with the lens control unit 26 through such communication units. The camera control unit 9 calculates an f-number or a shutter speed in photographing based on the luminance acquired from the photometric unit 5 and transmits a diaphragm driving command including the f-number to the lens control unit 26. Further, the camera control unit 9 calculates a driving direction and a driving amount of the focus lens 22 of the interchangeable lens 2 to an in-focus position based on the focus detection information and the information acquired from the lens control unit 26. The focus detection information includes the defocus amount calculated by the focus detection unit 6. The information acquired from the lens control unit 26 includes focus sensitivity information in the image height of the center and information on an image height change coefficient of the focus sensitivity. The camera control unit 9 transmits, to the lens control unit 26, a control signal of the focus driving command for instructing the calculated driving direction and amount and performs focus control of the imaging optical system. An auto-focus (AF) process of the camera body 1 side is a process of calculating the defocus amount in the focus detection operation and transmitting the control signal of the focus driving command from the camera control unit 9 to the lens control unit 26. An image plane AF operation to be described below is performed in every single vertical period 1V at the timing of the frame rate of the image capturing. For this reason, communication of information such as the focus sensitivity, the focus position, and the driving state is executed in every single vertical period 1V. The vertical period "1V" corresponds to a period of a vertical synchronizing signal.

A lens installation detector 10 has a switch, a photodetector, or the like to detect whether or not the interchangeable lens 2 is installed in the camera body 1. The lens installation detector 10 outputs a detection signal to the camera control unit 9. The camera communication unit 11 is paired with the lens communication unit 25, so that the camera control unit 9 acquires various types of information stored in the lens control unit 26. The various types of information include, for example, focus sensitivity information and sensitivity correction information. The sensitivity correction information is a sensitivity image height correction coefficient for correcting the focus sensitivity that changes depending on the image height. In the following description, such information will be referred to as sensitivity-related information. The camera control unit 9 stores the acquired information in a volatile memory (not shown).

A control system power source 12 of the camera body 1 supplies power to each of the imaging element 4, the photometric unit 5, the focus detection unit 6, the image processing unit 8, the display unit 33, a control system circuit of the interchangeable lens 2, and the like. In addition, a driving system power source 13 of the camera body 1 supplies power to the shutter control unit 7, a driving system circuit of the interchangeable lens 2, and the like.

An imaging preparation switch SW1 14 and an imaging start switch SW2 15 are control switches used when a user takes a photograph. The switch SW1 is turned on by a half-push manipulation of a release button, and the switch SW2 is turned on by a full-push manipulation of the release button. In the AF control, corresponding processes are started by using a signal of each of the switches SW1 and SW2 as a trigger.

The image recording unit 16 performs control for recording the acquired image data on a recording medium in a predetermined format. A manipulation unit has various manipulation members and switches. In FIG. 1, as a manipulation member according to the present embodiment, a focus detection point change manipulation member 32 for selecting a focus detection point is illustrated. The display unit 33 is configured to display captured images or various types of information of the camera. The various types of information include a display range for displaying a plurality of focus detection regions set on an image plane, and the like.

An imaging optical system of the interchangeable lens 2 has a zoom lens 21, a focus lens 22, an image blurring correction lens 23, and a diaphragm 24. The zoom lens 21 moves in an optical axis direction of the imaging optical system to change a focal length. The focus lens 22 is a focus adjustment lens moving in an optical axis direction of the imaging optical system. The image blurring correction lens 23 corrects image blurring caused by camera shake such as hand vibration by moving perpendicularly to the optical axis direction of the imaging optical system. The diaphragm 24 is configured to change the amount of photographic light depending on an aperture size (f-number) through variable control of the aperture size.

An electric circuit module 20 has the lens communication unit 25, the lens control unit 26, and driving units. The driving units include a zoom driving unit 27, a focus driving unit 28, a shake correction driving unit 29, and a diaphragm driving unit 30. The lens control unit 26 receives the focus sensitivity information, the focus driving command, and the like based on shooting information or a shooting status of the camera body 1 through the camera communication unit 11 and the lens communication unit 25. The lens control unit 26 outputs a focus driving signal to the focus driving unit 28 in response to the focus driving command.

The focus driving unit 28 has an actuator such as a step motor, a vibration motor, or a voice coil motor and moves the focus lens 22 to an in-focus position in response to the focus driving signal from the lens control unit 26. That is, the AF processing of the interchangeable lens 2 side is executed until the focus driving command is received, and the focus lens 22 is moved to the in-focus position.

The lens control unit 26 outputs a diaphragm driving signal to the diaphragm driving unit 30 in response to the diaphragm driving command acquired from the camera control unit 9. The diaphragm driving unit 30 has an actuator such as a step motor and drives the diaphragm 24 in response to the diaphragm driving signal from the lens control unit 26.

When a user manipulates a zoom operation ring (not shown) provided in the interchangeable lens 2, the lens control unit 26 outputs a zoom driving signal to the zoom driving unit 27 in order to move the zoom lens 21 in the zoom direction at the zoom driving speed corresponding to the manipulation. The zoom driving unit 27 has an actuator such as a step motor and drives the zoom lens 21 in response to the zoom driving signal from the lens control unit 26.

The lens control unit 26 outputs a shake correction driving signal to the shake correction driving unit 29 in response to a shake detection signal from a shake detection sensor such as an angular velocity sensor or an acceleration sensor (not shown) provided in the interchangeable lens 2. The shake correction driving unit 29 has an actuator such as a voice coil motor and drives an image blurring correction lens 23 in response to the shake correction driving signal from the lens control unit 26.

A memory unit 31 includes a storage device such as an electrically erasable programmable read-only memory (EEPROM) or a flash ROM. The memory unit 31 stores data including focus position deviation information, the focus sensitivity, and focus sensitivity image height correction coefficient information used to correct a result of the focus detection (defocus amount). In addition, the memory unit 31 may be disposed inside the lens control unit 26. The lens control unit 26 outputs the information read from the memory unit 31 to the lens communication unit 25, and the lens communication unit 25 transmits the information to the camera communication unit 11.

Next, an overview of the operation of the imaging apparatus will be described. When a user manipulates the imaging preparation switch (SW1) 14 to be ON, the camera control unit 9 causes the photometric unit 5 to perform a photometric operation and causes the focus detection unit 6 to perform a focus detection operation. According to the present embodiment, a process of acquiring a sensitivity image height correction coefficient that varies depending on a distance (image height component) from the optical axis in addition to the sensitivity of the optical axis (image height of the center) acquired from the interchangeable lens 2 is performed. The corrected sensitivity is acquired from the sensitivity image height correction coefficient and the image height component subjected to the focus detection. For the defocus amount acquired as a result of the focus detection, conversion to a driving amount (the number of pulses) to be instructed to the focus driving unit 28 is performed using the corrected sensitivity information. The lens control unit 26 performs focus driving control based on the driving amount instructed by the camera control unit 9. As the focus detection operation and the lens driving operation are repeated, the defocus amount is gradually reduced. In this process, when the detected defocus amount is significant, the focus lens driving operation and focus detection operation are overlappingly performed. That is, overlap driving is performed. As described below, according to the present embodiment, it is possible to reduce a communication load and a calculation load between the camera body 1 and the interchangeable lens 2 even in the overlap driving.

When a user manipulates the imaging start switch (SW2) 15 to be ON, the camera control unit 9 transmits a driving command of the diaphragm 24 to the lens control unit 26, controls the f-number in photographing, and causes the shutter control unit 7 to drive the shutter, so that the imaging element 4 is exposed at a predetermined shutter speed. In addition, the camera control unit 9 causes the image processing unit 8 to create a recording image from the output of the imaging element 4. The imaging element 4 has focus detection pixels dedicated to the auto-focus operation. Therefore, it is possible to acquire the focus detection signal along with the recording image. An auto-focus method performed by detecting phase differences using the imaging element 4 is also called "image plane phase difference AF." Alternatively, without being limited to the image plane phase difference AF, the focus detection may be performed using an AF sensor dedicated to phase difference detection. After the shooting, the camera control unit 9 instructs the image recording unit 16 to record a recording image signal in a recording medium (not shown) such as a semiconductor memory. The captured image is either a still image or a moving video. For example, if a still image shooting mode is selected using the mode selection switch, a still image is acquired. If a live-view mode or a moving video shooting mode is selected, a moving video is acquired. In an imaging apparatus provided with a record start button for capturing a moving video, a moving video recording operation is started by manipulating the record start button. A user is allowed to select a recording image quality by manipulating a recording image quality setting switch provided in the camera body 1.

Figure 2A:
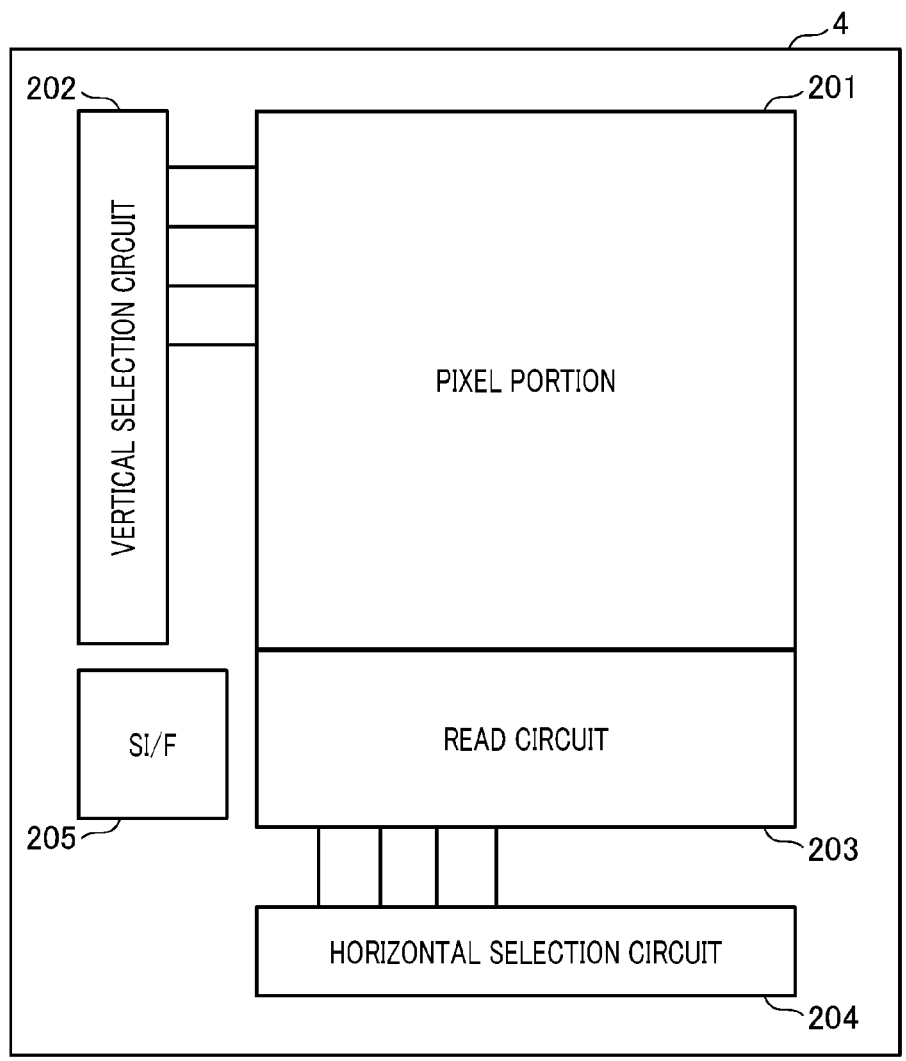
FIGS. 2A and 2B are schematic diagrams illustrating a configuration of an imaging element according to an embodiment of the present invention.
Figure 2B:
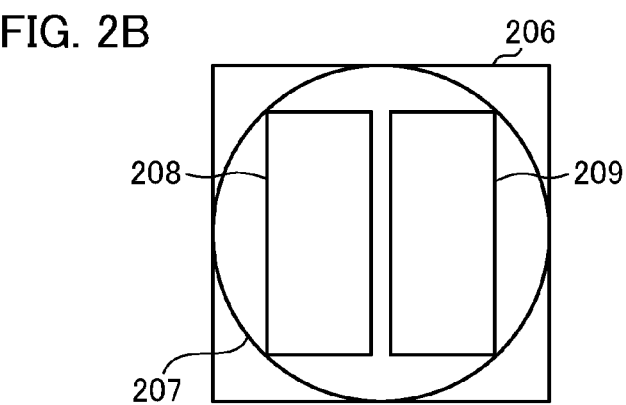

Next, a configuration for focus detection processing according to the present embodiment will be described. A configuration of the imaging element 4 will be described with reference to FIGS. 2A and 2B. FIG. 2A is a schematic diagram illustrating the entire configuration of the imaging element 4. FIG. 2B is a schematic diagram illustrating a single pixel of the imaging element 4. The imaging element 4 of FIG. 2A has a pixel portion 201 consisting of a plurality of pixels arranged in a 2-dimensional array shape. A vertical selection circuit 202 sequentially selects pixel signals from a plurality of rows of the pixel portion 201 and outputs the selected signal to a read circuit 203. The read circuit 203 reads the pixel signal selected by the vertical selection circuit 202 out of the pixels of the pixel portion 201. The read circuit 203 has a memory for accumulating signals, a gain amplifier, an analog/digital converter, and the like for each column. A horizontal selection circuit 204 sequentially selects a plurality of pixel signals read by the read circuit 203 for each column. A serial interface (SI/F) unit 205 acquires information such as an operation mode of each circuit determined by an external device. Further, in addition to the elements of FIG. 2A, the imaging element 4 may have other elements such as a timing generator configured to provide timing signals to the vertical selection circuit 202, the horizontal selection circuit 204, the read circuit 203, and the like, and a control circuit.

The pixel 206 of FIG. 2B has a single microlens 207 and a pair of photodiodes 208 and 209. A pair of photodiodes (PDs) serve as a photoelectric converter for performing the image plane phase difference AF. Further, the pixel 206 has a pixel amplifier for reading the photodiode signal to the read circuit 203, a row selection switch, a reset switch for resetting the photodiode signal, and the like in addition to the elements of FIG. 2B.

Figure 3:
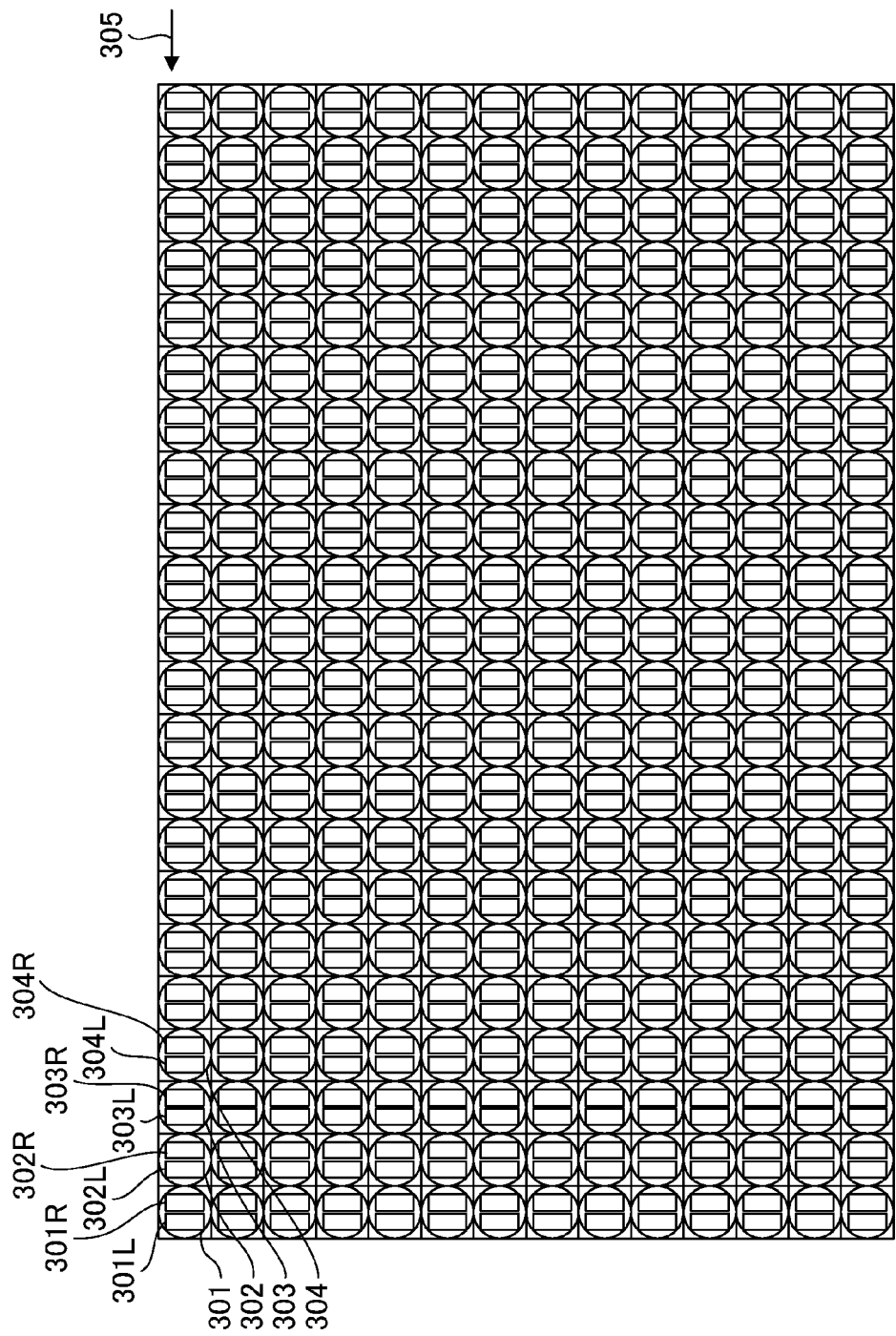
FIG. 3 is a schematic diagram illustrating a pixel portion of the imaging element according to an embodiment of the present invention.

FIG. 3 is a schematic diagram illustrating the pixel portion 201 of the imaging element 4. Since the pixel portion 201 provides a 2-dimensional image, a plurality of pixels are arranged in a 2-dimensional array shape. The pixels 301, 302, 303, and 304 have the configuration similar to that shown in FIG. 2B. The photodiodes 301L, 302L, 303L, and 304L are similar to the photodiode 208 shown in FIG. 2B. The photodiodes 301R, 302R, 303R, and 304R are similar to the photodiode 209 shown in FIG. 2B. Although a bisected photoelectric converter is illustrated by way of example in the present embodiment, a segment direction and the number of segments may be changed arbitrarily depending on a requirement of the apparatus.

Figure 4:
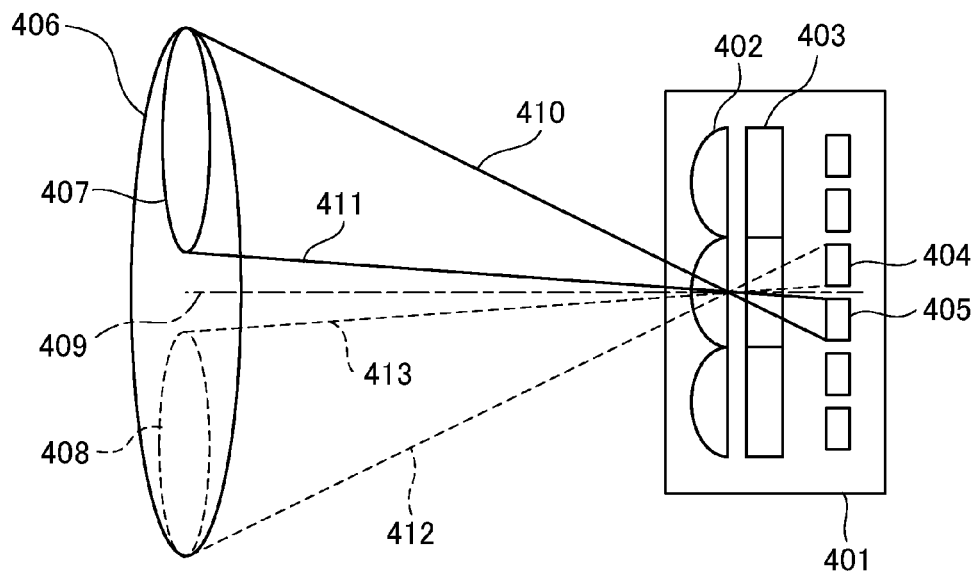
FIG. 4 is a conceptual diagram illustrating a bundle of light beams that emerge from an exit pupil of a photographic lens and are incident on the imaging element.

Detection of light on the imaging element 4 will be described with reference to FIG. 4. FIG. 4 is a conceptual diagram illustrating a bundle of light beams that emerge from an exit pupil of the photographic lens and are incident on the imaging element. FIG. 4 schematically illustrates the image plane phase difference detection AF method. On a part of the cross section 401 of the imaging element 4, a microlens 402 (corresponding to the microlens 207 of FIG. 2B) and a color filter 403 are illustrated. The photodiodes 404 and 405 correspond to the photodiodes 208 and 209 of FIG. 2B.

A center of the bundle of light beams that emerge from the exit pupil 406 of the photographic lens with respect to the pixel provided with the microlens 402 is indicated by the optical axis 409. The bundle of light beams that emerge from the exit pupil 406 is incident on the imaging element 4 and the bundle of light beams is centered on the optical axis 409. Pupil regions 407 and 408 are a part of the area of the exit pupil 406 of the photographic lens. The light beams 410 and 411 are light beams located on the outermost circumference of the bundle of light beams passing through the pupil region 407. The light beams 412 and 413 are light beams located on the outermost circumference of the bundle of light beams passing through the pupil region 408. Out of the bundle of light beams that emerge from the exit pupil 406, the upper part of the bundle of light beams is incident on the photodiode 405, and the lower part of the bundle of light beams is incident on the photodiode 404 with respect to the optical axis 409. That is, the photodiodes 404 and 405 receive the bundle of light beams passing through different regions on the exit pupil 406 of the photographic lens.

Although a pair of photodiodes are provided for a single microlens in FIGS. 2B and 3, the invention is not limited thereto. For example, a photodiode of one side may be used for a certain pixel, and a photodiode of the opposite side may be used for neighboring pixels. That is, the image plane phase difference AF can be achieved as long as the optical images passing through different regions of the exit pupil 406 of the photographic lens are acquired on the image plane of the imaging element.

The imaging element 4 is arranged in a 2-dimensional array shape including A-line pixels and B-line pixels that receive a bundle of light beams from different pupil regions of the photographic lens. Specifically, in FIG. 3, out of the pixels 301, 302, 303, and 304 of the row 305, pixels of the photodiodes 301L, 302L, 303L, and 304L are included in the A-line pixels. In addition, the pixels of the photodiodes 301R, 302R, 303R, and 304R are included in B-line pixels. For each output of the A-line and B-line pixels, an interval between two images (image spacing) is different depending on whether the image has an in-focus state, a front defocus state, or a rear defocus state. A defocus amount corresponding to the image spacing is calculated, and focus adjustment is performed by moving the focus lens 22 into the in-focus state. That is, the movement amount of the focus lens 22 can be calculated based on an image deviation amount between two images. Although the description has been made for two images (including an image of the A-line pixels and an image of the B-line pixels) and neighboring pixel lines for simplicity purposes in the present embodiment, the A-line pixels and the B-line pixels are classified based on the color filter in practice.

In the focus detection process, the image formed by the bundle of light beams passing through pupil regions having different optical systems is photoelectrically converted to generate a pair of image signals. The focus detection unit 6 detects a defocus amount based on a phase difference (image deviation amount) between the pair of image signals. A focus driving amount is calculated based on the detected defocus amount, and the driving of the focus lens is controlled based on the focus driving amount.

Figure 5:
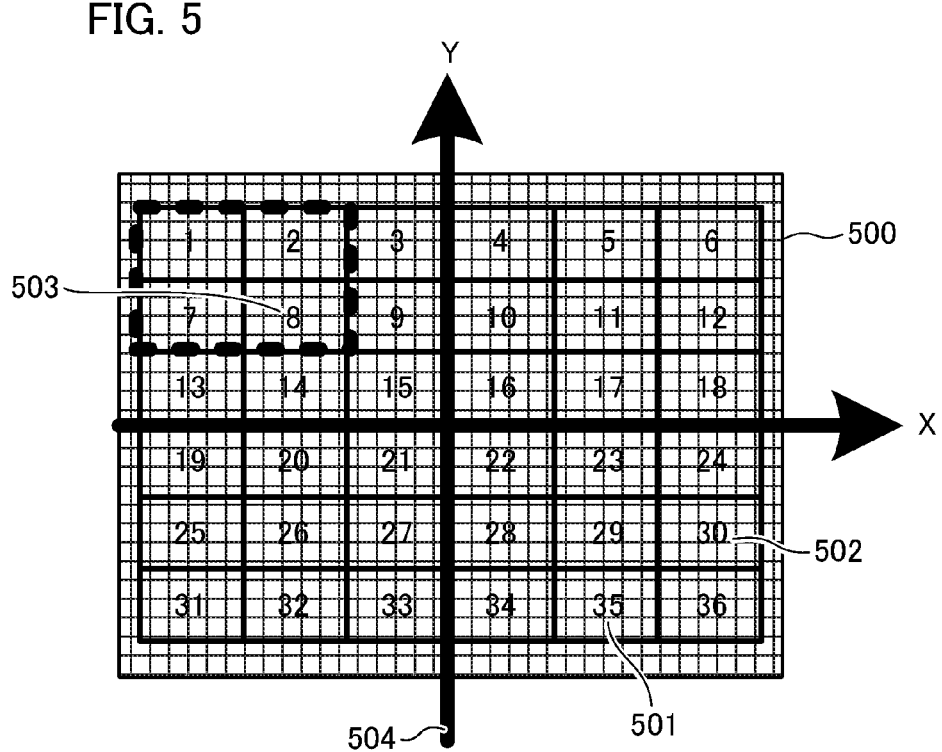
FIG. 5 is an explanatory diagram illustrating a multi-point auto-focus (AF) frame according to an embodiment of the present invention.

Next, a multi-point AF control method for focus detection across a wide range of the image height will be described as the image plane phase difference AF control according to the present embodiment with reference to FIG. 5. FIG. 5 is an explanatory diagram illustrating a multi-point focus detection frame based on a phase difference detection method. A pixel area 500 in the image plane is an area of pixels inside the imaging element 4 in which pixels dedicated to the phase difference detection method are arranged. The pixel area 500 indicates a shooting range. Since the pixel 501 dedicated to the phase difference detection method is arranged in the horizontal and vertical directions, a phase difference image signal for a subject can be acquired from each direction. A rectangular region acquired by combining a plurality of lines passing through the dedicated pixel 501 is defined as an AF frame region 502. The AF frame region 503 is a region including a single group surrounded by the dotted rectangular frame. In the coordinate system 504 of FIG. 5, "X" denotes a horizontal axis, and "Y" denotes a vertical axis.

When focus detection is performed using an AF frame arbitrarily selected by a user, the focus detection process is performed for the selected AF frame region 502. Meanwhile, in the case of subject tracking such as face recognition or multi-point auto-focus, the focus detection process is performed for all AF frames including the entire shooting range. In the example of FIG. 5, the focus detection process is performed for a total of 36 AF frames acquired by dividing the shooting range horizontally and vertically into "6×6." In FIG. 5, the numerals "1" to "36" are allocated from the upper left to the lower right to identify each AF frame.

Figure 6:
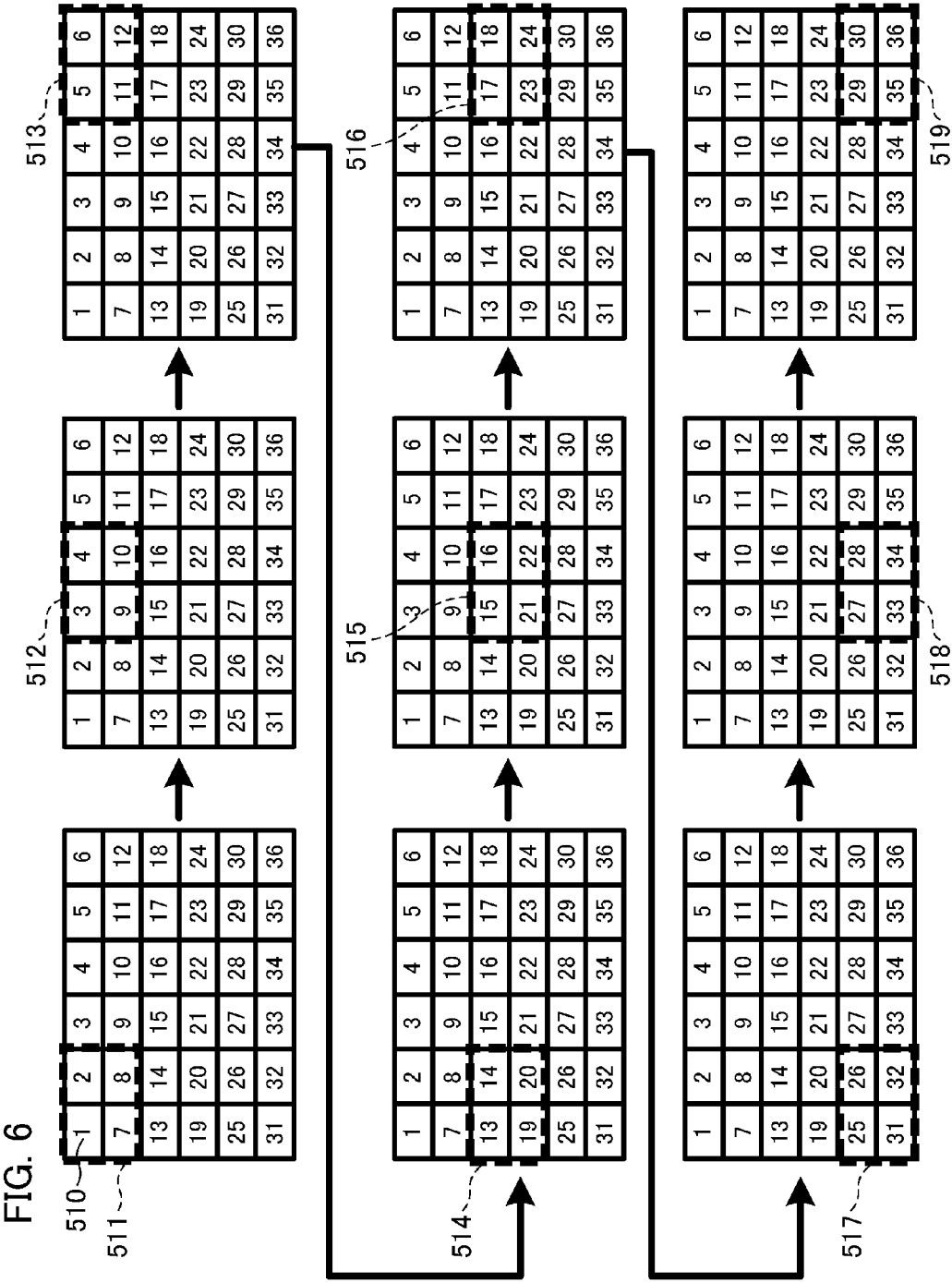
FIG. 6 is a diagram illustrating a process of selecting a multi-point AF frame according to an embodiment of the present invention.

However, as the number of pixels, the number of the multi-point AF frames, or a frame rate increases, it may be difficult to perform the focus detection process within a single vertical period 1V. In this case, it is difficult to perform focus detection across the entire shooting range at one time. In this regard, the shooting range is divided into a plurality of ranges, and the focus detection process is executed sequentially for the plurality of ranges. Specifically, as illustrated in FIG. 6, the focus detection process is executed for each of the focus detection regions acquired by dividing the shooting range. In FIG. 6, the shooting range is divided into nine groups of four regions, and the focus detection is performed for each group. In this case, in the focus detection process, what AF frame is employed is not yet determined. For this reason, the camera control unit 9 acquires focus-sensitivity-related information from the lens control unit 26. In the correction process using the focus-sensitivity-related information, image height position information of each AF frame is necessary. Therefore, 2-dimensional coordinate information is acquired by setting the coordinate system 504 of FIG. 5. A position is represented by coordinates (X, Y) on the X-Y plane by setting the image height of the center of the coordinate system 504 to zero.

The region 510 of FIG. 6 (including AF frames 1, 2, 7, and 8) corresponds to the pixel 501 dedicated to the phase difference detection method of FIG. 5. A rectangular frame 511 surrounded by the dotted line indicates a region in which the focus detection process can be performed by grouping a plurality of AF frames at one time. The entire shooting range is covered by the rectangular frames 511 to 519, and a focus detection region is acquired by grouping four frames to a single set, so that the focus detection process is executed repeatedly using each output of nine frames. Specifically, during three initial vertical periods 1V to 3V, the focus detection region is shifted sequentially for the rectangular frames 511, 512, and 513, and focus detection is performed for an upper part of the imaging element 4. During the next three vertical periods 4V to 6V, the focus detection region is shifted sequentially for the rectangular frames 514, 515, and 516, so that the focus detection is performed for a center part of the imaging element 4. Furthermore, during the next three vertical periods 7V to 9V, the focus detection region is shifted sequentially for the rectangular frames 517, 518, and 519, so that the focus detection is performed for a lower part of the imaging element 4. In this manner, during the vertical periods 1V to 9V, the focus detection signals are acquired across the entire shooting range.

Figure 7:
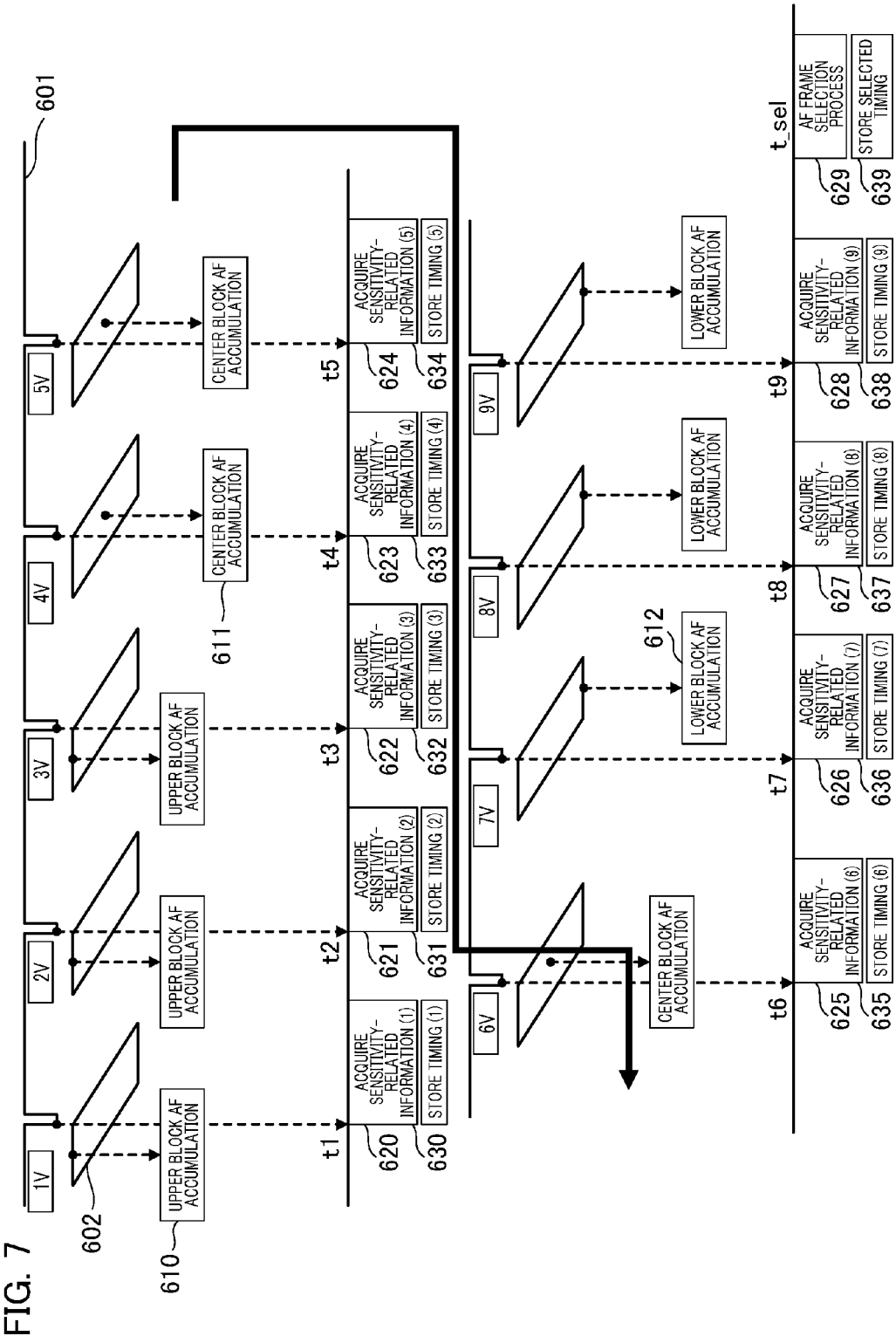
FIG. 7 is a timing chart illustrating timing control for the multi-point AF frame according to an embodiment of the present invention.

Next, focus detection timings for the multi-point AF frames will be described with reference to FIG. 7. FIG. 7 is a timing chart acquired by repeatedly performing the focus detection using nine frames of FIG. 6. The signal 601 indicates a behavior of a signal line used in photographing in a time-series manner. A start timing of the imaging process is indicated by a time point of the falling edge of the signal 601 in a period corresponding to the frame rate, that is, the VD signal period. The trapezoid 602 indicates an accumulation timing of the imaging element 4. The accumulation control of the imaging element 4 is performed within the VD signal period, and the accumulation in an upper part of the imaging element is performed in the vicinity of the leading edge of the VD signal. As reading in the lower part of the imaging element is performed, the accumulation is performed at a latter half of the VD signal period. According to the present embodiment, since the pixel dedicated to phase difference detection is arranged in the imaging element 4, the accumulation timing of the AF pixel is determined by a position of the AF frame. Processing for the nine frames of FIG. 6 will now be described with reference to the timing chart of FIG. 7.

In the initial three vertical periods 1V to 3V, the AF pixels in the upper part of the imaging element 4 are used. Therefore, the phase difference detection signal is acquired at the timing 610 for "UPPER BLOCK AF ACCUMULATION." In the next three vertical periods 4V to 6V, the AF pixels in the center part of the imaging element 4 are used. Therefore, the phase difference detection signal is acquired at the timing 611 for "CENTER BLOCK AF ACCUMULATION." Further, in the next three vertical periods 7V to 9V, the AF pixels in the lower part of the imaging element 4 are used. Therefore, the phase difference detection signal is acquired at the timing 612 for "LOWER BLOCK AF ACCUMULATION."

Meanwhile, the camera control unit 9 acquires the focus-sensitivity-related information from the lens control unit 26 at the timings 620 to 628 corresponding to "ACQUIRE SENSITIVITY-RELATED INFORMATION (1) to (9)," that is, at each falling edge of the signal 601. The camera control unit 9 stores timing information corresponding to each frame 1V to 9V in the memory in association with the acquired focus-sensitivity-related information. The defocus status of all AF frames is determined by acquiring a result of the focus detection for the nine frames. Therefore, selection of the AF frame is allowed at the selection timing 629 indicated by "AF FRAME SELECTION PROCESS." As a criterion for selecting the AF frame, for example, the closest AF range may be selected, or a waveform of the phase difference detection result of the focus detection having highest reliability may be selected, as necessary. In addition, so-called overlap control in which the focus lens is driven in the course of focus detection may also be performed. In this case, it is necessary to consider the lens driving amount from the timing at which the focus detection process starts to the timing at which the AF frame is determined as an idle running amount. In order to acquire the lens idle running amount, data of each timing t1 to t9 is stored in the memory at the timings 630 to 638 indicated by "STORE TIMINGS (1) to (9)" corresponding to the falling edges of the VD signal for each of the nine frames. In addition, at the AF frame selection timing 639, the timing t_sel at that time point is acquired. In the process of calculating the lens idle running amount, when the rectangular frame 512 of FIG. 6 set as, for example, a second vertical period 2V is selected, it is conceived that the focus lens is driven at a constant speed for a period from the timing t2 to the timing t_sel. The movement amount of the focus lens that moves at a constant speed is calculated as the lens idle running amount. The focus detection result acquired at the second vertical period 2V is converted into the focus driving amount using the accurate sensitivity acquired from Formula (1) below, and the lens idle running amount is subtracted therefrom, so that it is possible to acquire the lens driving amount necessary for the in-focus state.

Next, a multi-point auto-focus process performed by the camera control unit 9 according to the present embodiment will be described with reference to the flowchart of FIG. 8. In step S701, a user sets a focus detection point automatic selection mode using a focus detection point change manipulation member 32 included in a manipulation unit of the camera. When the imaging preparation switch (SW1) 14 is turned on, the camera control unit 9 starts the multi-point auto-focus process.

In step S702, in order to set the blocks indicated by the rectangular frame 511 in FIG. 6 as the AF frame, the camera control unit 9 sets control information in the focus detection unit 6. In step S703, the camera control unit 9 detects the VD signal of the photographing and determines whether or not there is a VD interruption. The VD interruption is generated periodically depending on the VD signal. In step S703, if the VD signal is detected, the process advances to step S704. If the VD signal is not detected, the determination process of step S703 is repeated.

In step S704, the camera control unit 9 acquires the focus-sensitivity-related information from the lens control unit 26 through the lens communication unit 25 and the camera communication unit 11. The "sensitivity information at the image height of the center" of the focus-sensitivity-related information is information determined based on the optical information stored in the lens control unit 26. The optical information includes information on positions of the zoom lens 21, the focus lens 22, and the image blurring correction lens 23, the f-number of the diaphragm 24, information on accessories (such as an extender) (not shown), and the like. The sensitivity information is information indicating a value at the center of the image plane, that is, a value at the zero image height (the image height of the center). In addition, the "sensitivity image height correction coefficient" of the focus-sensitivity-related information is a focus sensitivity correction coefficient for correcting the focus sensitivity indicated by the "sensitivity information at the image height of the center" acquired from the lens control unit 26. The origin on the X-Y plane of FIG. 5, that is, the coordinates of the image height of the center, is denoted by "(0, 0)." The sensitivity $S(X, Y)$ of the image height coordinates $(X, Y)$ can be calculated using an X-Y polynomial as expressed in the following Formula (1).

[Formula 1]

$$S(X,Y)=S_0\times(a_0+a_1X^2+a_2X^4+a_3Y^2+a_4Y^4+a_5X^2Y^2) \quad (1)$$

In Formula (1), "S0" denotes focus sensitivity acquired from the lens control unit 26. Each of factors "a0" to "a5" denotes a focus sensitivity correction coefficient. In this manner, a coefficient indicating a change amount of the sensitivity depending on the image height is included in the data acquired by the camera control unit 9 from the lens control unit 26. The sensitivity information according to the present embodiment is information calculated through polynomial approximation for a characteristic of the focus sensitivity for the image height of the center. Alternatively, the sensitivity information according to the present embodiment may be calculated through linear approximation.

In addition to the method described above, the camera control unit 9 may give the image height information to the lens control unit 26, and the sensitivity information of the image height instructed to the lens control unit 26 may be transmitted to the camera control unit 9. However, since this method relates to an increase of the multi-points of the AF frame or an increase of the frame rate, a communication band between the camera control unit 9 and the lens control unit 26 may become short, or the calculation load of the control unit may increase. Therefore, it is preferable that the camera control unit 9 acquire the focus sensitivity correction coefficient from the lens control unit 26 as in the present embodiment in terms of the load reduction.

In step S705, it is determined whether or not the accumulation of AF-dedicated pixels in the imaging element 4 is completed. If it is determined that the accumulation of AF-dedicated pixels is completed, the camera control unit 9 advances the process to step S706. If it is determined that the accumulation of AF-dedicated pixels is not completed, the camera control unit 9 waits for the completion. In step S706, the AF-dedicated pixels corresponding to the AF frame position set in step S702 are read, and the focus detection unit 6 acquires the focus detection information of the phase difference detection. In step S707, the camera control unit 9 stores the focus detection information acquired in step S706 and the sensitivity-related information acquired in step S704 in the memory in association with each other.

In step S710, it is determined whether or not the focus detection for the AF-dedicated pixels of all AF frames has been completed. The camera control unit 9 determines whether or not the focus detection is repeatedly performed for the area indicated by the rectangular frames 511 to 519 of FIG. 6. If it is determined that the focus detection is not completed for all of the AF frames, the camera control unit 9 returns the process to step S702 and continues the process by resetting the next focus detection region to the AF frame position. If it is determined that the focus detection is completed for all of the AF frames, the process advances to step S711.

In step S711, an AF frame position selection process is performed. An optimum focus detection result is selected from the focus detection results for all of the AF frames, specifically, the focus detection results for nine frames across the area of the rectangular frames 511 to 519 of FIG. 6. The optimum focus detection result is determined by the camera control unit 9 from the focus detection signals satisfying the AF frame selection criterion based on a predetermined determination criterion. In step S712, the camera control unit 9 acquires the focus-sensitivity-related information associated with the focus detection result stored in step S707 for the focus detection result selected in step S711. That is, the focus-sensitivity-related information for the focus detection result selected in step S711 is acquired based on a relationship between the acquired focus detection information and the focus-sensitivity-related information. In this case, an additional process such as interpolation is executed as necessary.

In step S713, the camera control unit 9 executes a calculation process by applying Formula (1) to the image height position of the AF frame selected in step S711 using the focus-sensitivity-related information acquired in step S712. As a result, focus sensitivity information corrected with high accuracy is calculated. In step S714, the focus lens driving amount is calculated from the focus detection result using the focus sensitivity information calculated in step S713. That is, the camera control unit 9 calculates a pulse count for driving the focus lens 22 from the defocus amount as the focus detection result. The camera control unit 9 transmits a driving instruction including the calculated pulse count to the lens control unit 26 to request focus driving. In step S715, the AF frame position selection process under the multi-point AF control is completed.

According to the present embodiment, for example, when the focus detection results are acquired at a plurality of VD signal timings, the previous focus detection result, that is, the history data, is read from the memory for use. In this case, a process of storing the focus detection results and the focus-sensitivity-related information in association with each other is performed. The camera body acquires a correction coefficient for correcting the sensitivity in consideration of the image height along with the sensitivity information of the image height of the center, determines the AF frame position, and calculates the focus sensitivity information. In focusing at the surrounding image height, it is possible to correct the focus sensitivity change amount depending on the position of the focus detection using an optimum AF control method. According to the present embodiment, even when the number of multi-point auto-focus frames and the frame rate increase, it is possible to apply optimum sensitivity information while reducing the calculation load. Therefore, it is possible to provide an interchangeable camera-lens system capable of improving focus adjustment accuracy.

In the present embodiment, the multi-point auto-focus mode has been described as a control mode for dividing the area of the image plane in a grid shape and executing the focus detection for each divided focus detection region. Alternatively, the aforementioned process may be applied to a zonal AF mode in which the focus detection is executed for each predetermined zone. This similarly applies to other embodiments described below.

Second Embodiment

Next, a second embodiment of the invention will be described. According to the present embodiment, the camera control unit 9 has a driving range for determining the focus detection result (defocus amount) used in the final driving of the focus lens 22 when the camera control unit 9 performs the phase detection AF control. This driving range corresponds to a length acquired by multiplying a permissible circle of confusion of the imaging element 4 by an arbitrary ratio, and will be referred to as a "final driving range." The camera control unit 9 selects a sensitivity correction execution range from the final driving range and determines whether or not the focus detection result (defocus amount) is within the sensitivity correction execution range. If it is determined that the focus detection result is within the sensitivity correction execution range, the corresponding focus detection result is used in the final driving. As a result, it is possible to realize an in-focus operation through AF control without generating a hunting phenomenon. Note that, in the present embodiment, like reference numerals denote like elements as in the first embodiment, and the description will focus on differences without repeatedly describing such elements.

Multi-point auto-focus processing in the camera body side according to the present embodiment will be described with reference to the flowchart of FIG. 9. In step S801, an AF frame position selection process is initiated, so that the process of steps S802 and S803 is executed. The process of steps S802 and S803 is similar to the process of steps S702 and S703 of FIG. 8, and will not be repeatedly described.

Then, in step S804, the camera control unit 9 acquires the focus-sensitivity-related information from the lens control unit 26 through the lens communication unit 25 and the camera communication unit 11. Out of the focus-sensitivity-related information, the sensitivity indicated by the "sensitivity information at the image height of the center" refers to a value at the center of the image plane, that is, a value at the zero image height (image height of the center). The process of steps S805, S806, S807, and S810 is similar to the process of steps S705, S706, S707, and S710 of FIG. 8. However, in step S807, the focus detection information acquired in step S806 and the sensitivity-related information acquired in step S804 (sensitivity information at the zero image height) are stored in the memory in association with each other.

In step S810, when the focus detection is completed for all of the AF frames, the process advances to step S811. In step S811, the camera control unit 9 sets the sensitivity correction execution range. First, the camera control unit 9 acquires focal length information of the imaging optical system through the lens communication unit 25 and the camera communication unit 11. Then, the camera control unit 9 calculates the sensitivity correction execution range from the overall focus detection results, specifically, from the focus detection result list from the nine frames repeatedly performed for the area indicated by the rectangular frames 511 to 519 of FIG. 6 based on image height information of the AF frame farthest from the image height of the center. The calculation method will be described below with reference to FIG. 10.

Figure 8:
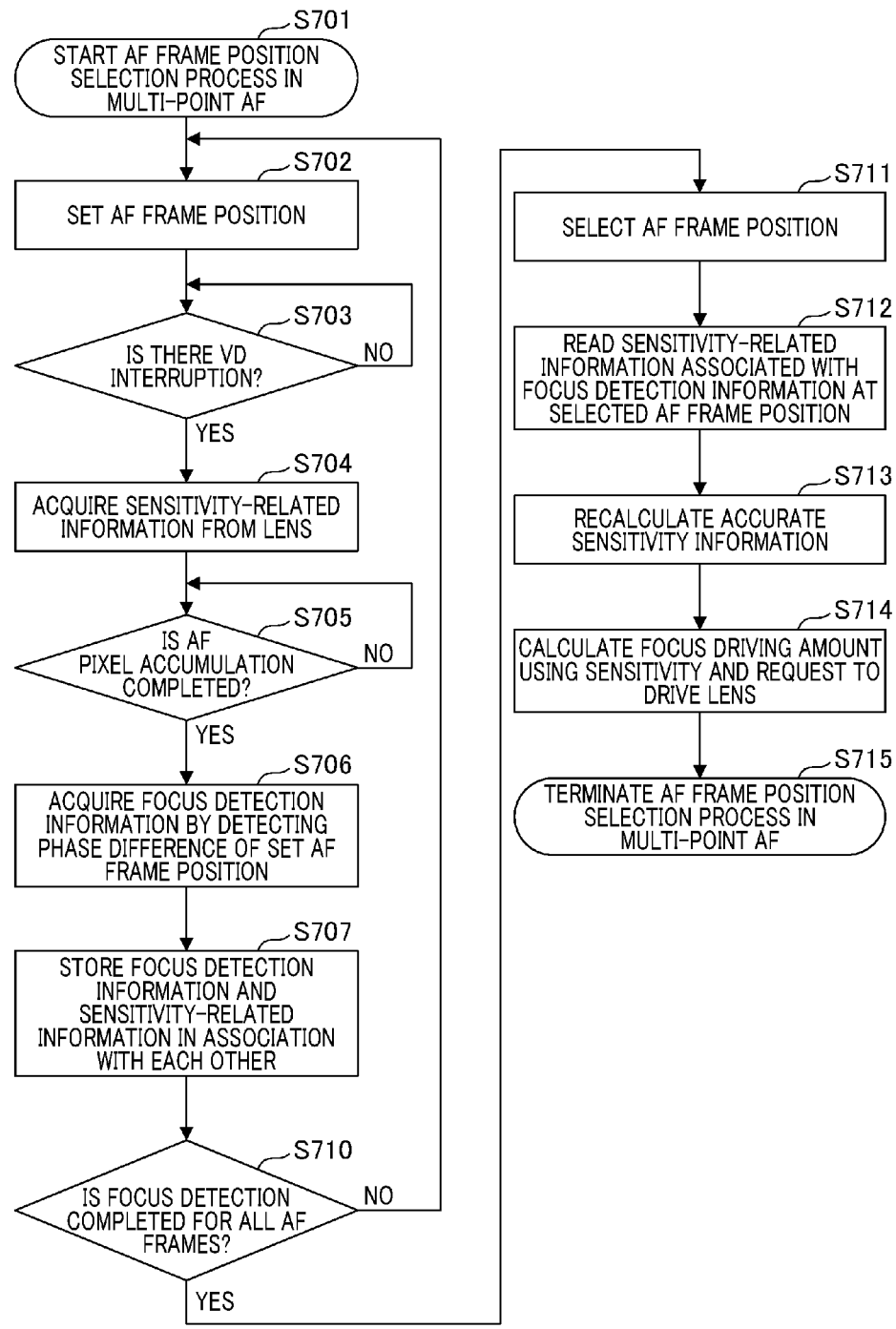
FIG. 8 is a flowchart illustrating a process of selecting an AF frame in the multi-point AF operation and correcting sensitivity according to a first embodiment of the present invention.
Figure 9:
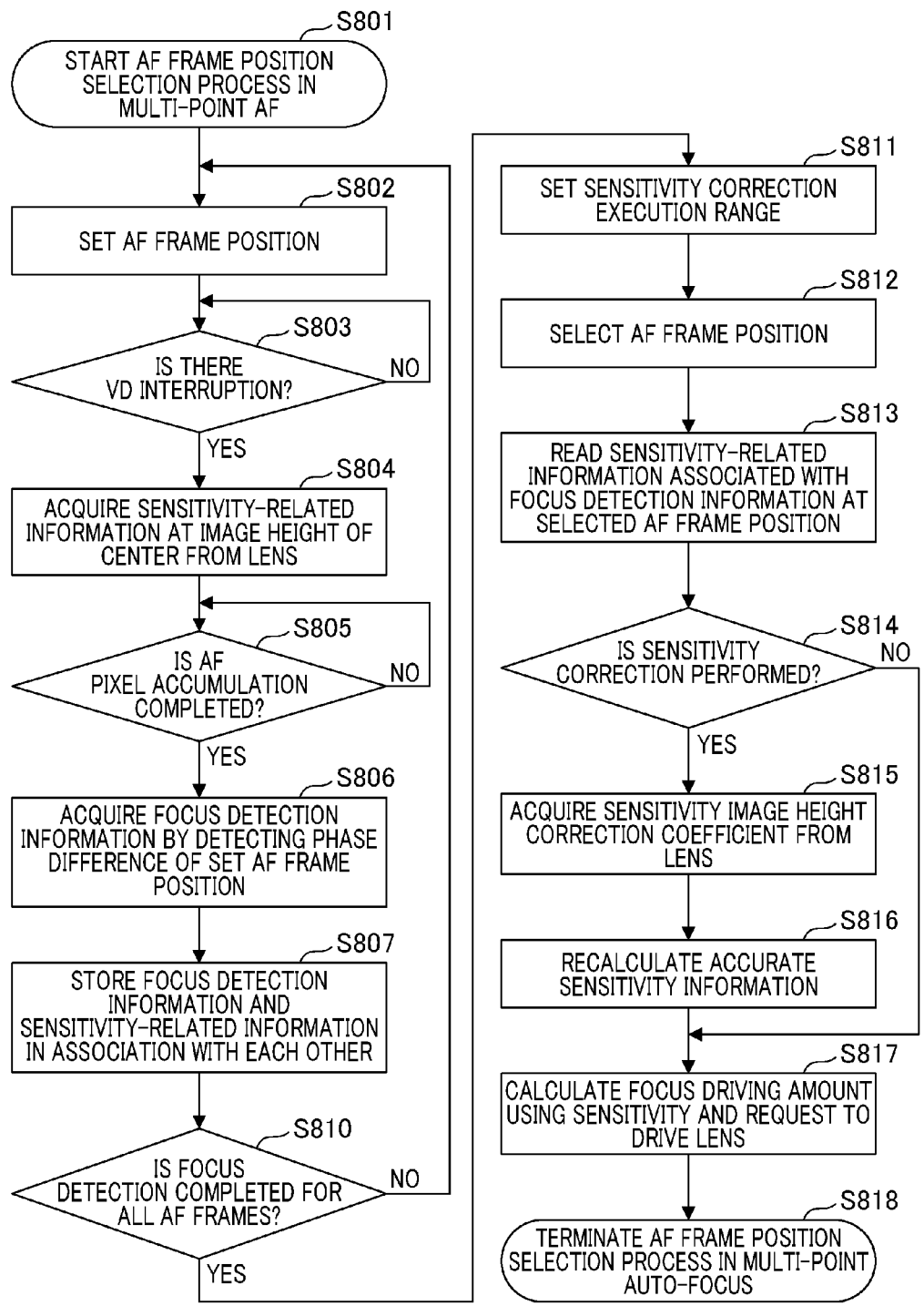
FIG. 9 is a flowchart illustrating a process of selecting an AF frame in the multi-point AF operation and correcting sensitivity according to a second embodiment of the present invention.

The process of steps S812 and S813 is similar to the process of steps S711 and S712 of FIG. 8. However, in step S813, for the focus detection result selected in step S812, the focus-sensitivity-related information associated with the focus detection result stored in step S807 (sensitivity information at the zero image height) is acquired.

In step S814, the camera control unit 9 determines whether or not the sensitivity correction process is performed based on the sensitivity correction execution range set in step S811 and the focal length information acquired in step S811. The defocus amount is calculated based on the focus detection result at the AF frame position selected in step S812 and the focus-sensitivity-related information acquired in step S813. The camera control unit 9 determines that the sensitivity correction process is performed if the calculated defocus amount is within the sensitivity correction execution range set in step S811. If the defocus amount is not within the sensitivity correction execution range set in step S811, it is determined that the sensitivity correction process is not performed. The determination process will be described below in more detail with reference to FIG. 11. In addition, the camera control unit 9 determines that the sensitivity correction process is not performed if the focal length is longer than a predetermined threshold value. If it is determined that the sensitivity correction process is performed, the process advances to step S815. If it is determined that the sensitivity correction process is not performed, the process advances to step S817. Note that the criterion for determining whether or not the sensitivity correction process is performed may be selected from those other than that of the present embodiment as necessary.

In step S815, the camera control unit 9 acquires data on the "sensitivity image height correction coefficient" from the lens control unit 26 through the lens communication unit 25 and the camera communication unit 11. This data is data on the focus sensitivity correction coefficient for correcting the focus sensitivity of the image height of the center. The sensitivity S(X, Y) is calculated based on Formula (1) described above. The process of step S816 and S817 is similar to the process of steps S713 and S714 of FIG. 8. In step S818, the AF frame position selection process for the multi-point auto-focus processing is terminated.

Figure 10:
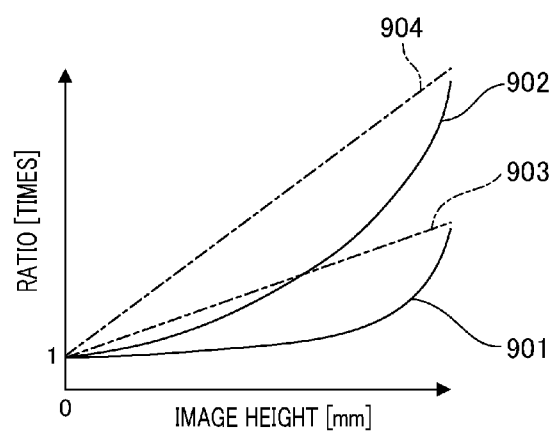
FIG. 10 is a graph illustrating a sensitivity ratio and a sensitivity correction ratio according to the second embodiment of the present invention.

Next, a sensitivity correction execution range calculation method will be described with reference to FIG. 10. In FIG. 10, the ordinate denotes the image height (in units of millimeters), and the abscissa denotes a ratio. In addition, the sensitivity ratio and the sensitivity correction ratio are illustrated at the focal lengths A and B (in units of millimeters). The camera control unit 9 calculates the sensitivity correction ratio from the image height and a coefficient (referred to as "α") that varies depending on the stored focal length. The image height is acquired from the image height coordinates (X, Y) of the AF frame farthest from the image height of the center set in step S811 of FIG. 9 using Formula (2) below. The sensitivity correction ratio is acquired by applying the image height and the coefficient α to Formula (3) below.

$$\text{image height} = \sqrt{(X^2 + Y^2)} \tag{2}$$

$$\text{sensitivity correction ratio} = 1 + (\text{image height} \times \alpha) \tag{3}$$

In FIG. 10, a curve 901 indicated by the solid line represents a sensitivity ratio at the focal length of A mm, and a curve 902 indicated by the solid line represents a sensitivity ratio at the focal length of B mm. Both the sensitivity ratios are set to "1" at the zero image height and increase as the image height increases. If the sensitivity ratio at the focal length of A mm has a characteristic represented on the curve 901, the sensitivity correction ratio calculated from Formulas (2) and (3) is represented on the curve 903 indicated by the one-dotted chain line. The value of the sensitivity correction ratio is set to "1" at the zero image height and linearly increases as the image height increases. In addition, if the sensitivity ratio at the focal length of B mm has a characteristic indicated by the curve 902, the sensitivity correction ratio calculated from Formulas (2) and (3) is represented on the curve 904 indicated by the one-dotted chain line. The value of the sensitivity correction ratio is set to "1" at the zero image height and linearly increases as the image height increases. The inclination thereof is larger than that of the curve 903.

The camera control unit 9 calculates the sensitivity correction execution range by applying the calculated sensitivity correction ratio and the final driving range to Formula (4) below.

$$\text{sensitivity correction execution range} = \text{sensitivity correction ratio} \times \text{final driving range} \quad (4)$$

According to the present embodiment, calculation of the sensitivity correction ratio is expressed as a primary interpolation function of the image height, and calculation of the sensitivity correction execution range is expressed as a primary function of the sensitivity correction ratio. However, such expressions are only for exemplary purposes, and any other interpolation functions and expressions may also be employed. In addition, the camera control unit 9 may acquire data on the coefficient α from the lens control unit 26 through the lens communication unit 25 and the camera communication unit 11.

Figure 11:
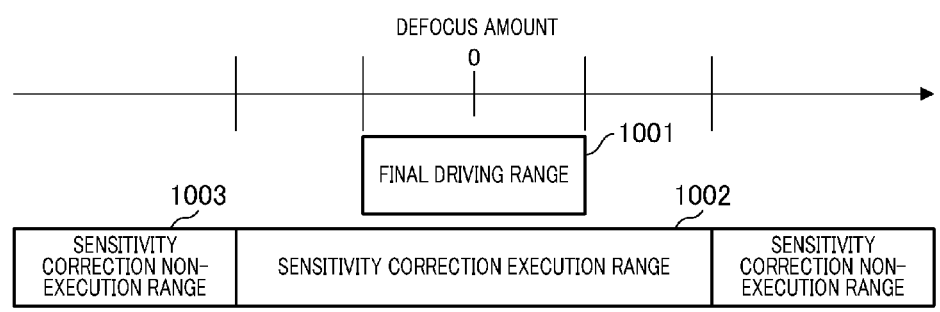
FIG. 11 is a diagram illustrating a process of setting a sensitivity correction execution range according to the second embodiment of the present invention.

A method of setting the sensitivity correction execution range and a method of determining whether or not the sensitivity correction process is performed will be described with reference to FIG. 11. FIG. 11 is an explanatory diagram illustrating a relationship between the defocus amount, the final driving range 1001, the sensitivity correction execution range 1002, and the sensitivity correction non-execution range 1003. The sensitivity correction execution range 1002 is calculated in step S811 of FIG. 9 using Formula (4), and the final driving range 1001 is set as a center. The final driving range 1001 is a predetermined range centered at the zero position of the defocus amount, and a range acquired by multiplying the sensitivity correction ratio by the final driving range 1001 is set to the sensitivity correction execution range 1002. The camera control unit 9 determines whether the defocus amount calculated based on the focus detection result selected in step S812 and the focus-sensitivity-related information acquired in step S813 is within the sensitivity correction execution range 1002 or the sensitivity correction non-execution range 1003. If the defocus amount is within the sensitivity correction execution range 1002, it is determined in step S814 of FIG. 9 that the sensitivity correction process is executed. If the defocus amount is within the sensitivity correction non-execution range 1003, it is determined in step S814 that the sensitivity correction process is not executed.

According to the present embodiment, the focus sensitivity correction process is executed only within the sensitivity correction execution range set in the vicinity of the final driving range and acquired by reflecting a change of the focus sensitivity depending on the image height. According to the present embodiment, it is possible to improve focus adjustment accuracy while a communication load between the camera body and the lens unit and the calculation load of the camera body are reduced. Furthermore, the embodiments of the invention can be effectively applied to an increase of the number of frames in the multi-point autofocus operation and an increase of the frame rate.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-161604, filed Aug. 19, 2015 which is hereby incorporated by reference wherein in its entirety.

What is claimed is:

1. A lens apparatus t is capable of being mounted to a camera apparatus, the lens apparatus comprising;
   an imaging optical system including a lens; and
   at least one processor executing computer executable instructions or at least one circuit which functions as;
   a communication unit configured to communicate with a camera apparatus; and
   a control unit configured to control communication of the communication unit and driving of the lens;
   wherein the control unit transmits, through the communication unit, a first information for cony ling a focus detection signal to a driving amount of the lens and a second information corresponding to a change of the first information according to an image height,
   wherein the control unit controls driving of the lens based on a control signal indicating the driving amount of the lens received by the communication unit, and
   wherein the control unit transmits the second information through the communication unit corresponding to every focus detection und a control mode in which the focus detection is performed for focus detection regions at different timings.

2. The lens apparatus according to claim 1, wherein the second information include plurality of information each corresponding to one of the focus detection regions, each of the focus detection corresponds to different image height.

3. The lens apparatus according to claim 1, wherein the control signal indicates the driving signal generated based on the first information and the second information corresponding to the image height of the selected focus detection region.

4. A control method of a lens apparatus that is capable of being mounted to a camera apparatus and comprises an imaging optical system including a lens, the method comprising:
   communicating with a camera apparatus,
   controlling communication of driving of the lens;
   transmitting a first information for converting a focus detection signal to a driving amount of the lens and a second information corresponding to a change of the first information according to an image height;
   controlling driving of the lens based on a control signal indicating the driving amount of the lens; and
   transmitting the second information in every focus detection timing under a control mode in which the focus detection is performed for focus detection regions at different timings.

5. An imaging apparatus comprising:
at least one processor executing computer executable instructions or at least one circuit which functions as:
a communication unit configured to communicate with a unit provided with a focus adjustment lens;
a detection unit configured to acquire a focus detection signal in a plurality of regions; and
a control unit configured to generate a control signal for controlling driving of the lens based on the focus detection signal and transmit the control signal to the lens unit through the communication unit,
wherein the control unit acquires, through the communication unit from the lens unit, a first information for converting a focus detection signal to a driving amount of the lens and a second information corresponding to a change of the first information according to an image height,
wherein the control unit selects a region used to control the driving of the lens from the plurality of the regions after acquiring the first information and the second information,
wherein the control unit generates the driving amount of the lens as the control signal from the first information and the second information depending on the image height of the selected region, and
wherein the control unit acquires at least the first information from the lens unit in every focus detection timing under a control mode in which the focus detection is performed for the plurality of the plurality of regions at different timings.

6. The imaging apparatus according to claim 5, wherein the control unit classifies the plurality of the regions into a plurality of groups and repeats acquiring the of the second information in units of the groups.

7. The imaging apparatus according to claim 6, wherein a position of the lens moves while repeating the acquiring of the second information.

8. The imaging apparatus according to claim 5, wherein the detection unit acquires the focus detection signal in a plurality of focus detection regions set within an image plane.

9. The imaging apparatus according to claim 5, wherein the control unit calculates the driving amount of the lens using an information based on the first information and the second information, if a defocus amount indicated by the focus detection signal is within a predetermined execution range.

10. The imaging apparatus according to claim 9, wherein the control unit sets the execution range using a correction ratio calculated from the image height.

11. The imaging apparatus according to claim 5, wherein the control unit stores the focus detection signals acquired at different timings, the conversion information, and the correction information in a memory unit in association with each other, and acquires at least the second information corresponding to the focus detection region selected from the plurality of the focus detection regions from the memory unit.

12. The imaging apparatus according to claim 6, wherein the group is obtained by dividing the area of the image plane in a grid shape, and the control unit executes the focus detection for each of the divided focus detection regions.

13. A control method of an imaging apparatus, the method comprising:
communicating with a lens unit provided with a focus adjustment lens;
acquiring a focus detection signal in a plurality of regions;
generating a control signal for controlling driving of the lens based on the focus detection signal and transmit the control signal to the lens unit;
acquiring, from the lens unit, a first information for converting a focus detection signal to a driving amount of the lens and a second information corresponding to a change of the first information according to an image height;
selecting a region used to control the driving of the lens from the plurality of the regions after acquiring the first information and the second information;
generating the driving amount of the lens as the control signal from the first information and the second information depending on the image height of the selected region, and
acquiring at least the first information from the lens unit in every focus detection timing under a control mode in which the focus detection is performed for the plurality of regions at different timing.

* * * * *

UNITED STATES PATENT AND TRADEMARK OFFICE
CERTIFICATE OF CORRECTION

PATENT NO. : 10,097,749 B2  
APPLICATION NO. : 15/233341  
DATED : October 9, 2018  
INVENTOR(S) : Takanashi et al.

Page 1 of 1

It is certified that error appears in the above-identified patent and that said Letters Patent is hereby corrected as shown below:

In the Claims

Column 16, Line 31, delete "a first information for cony ling a focus" and insert --a first information for converting a focus--

Column 16, Line 40, delete "every focus detection und a control mode in which the" and insert --every focus detection timing under a control mode in which the--

Column 18, Line 42, delete "of regions at different timing." and insert --of regions at different timings.--

Signed and Sealed this  
Eighteenth Day of August, 2020

Andrei Iancu  
*Director of the United States Patent and Trademark Office*